Patented Mar. 9, 1943

2,313,289

UNITED STATES PATENT OFFICE 2,313,289

PROCESS FOR THE PRODUCTION OF ARTIFICIAL SKINS FOR SAUSAGES, IN PARTICULAR, SALAMI

Čeněk Bednář, Neu-Rausnitz, Moravia; vested in the Alien Property Custodian

No Drawing. Application August 24, 1940, Serial No. 354,090. In Czechoslovakia August 17, 1938

5 Claims. (Cl. 99—176)

This invention relates to the production of artificial skins for sausages, in particular, salami.

It is well known to make artificial skins for sausages by saturating a paper case which has previously been immersed in boiling water for a short time with a mass of animal substances. It has not been possible, however, to obtain such adaptability of the skin as would make it adhere to the contents of the sausage in the manner natural guts would stick. When a sausage is boiled, the periphery of its meaty contents will decrease, that is, the stuffing will shrink. Artificial skins as hitherto used will not shrink in the same proportion, but will form air-filled wrinkles when the sausage is cold. Thereby, not only the appearance of the sausage will suffer, but also its durability. Hence, such artificial skins can only be used for sausages which are readily consumed, but not for sausages that keep well, such as salami or export sausages.

Somewhat better appropriated for the said latter purpose are artificial skins made from paper obtained from certain special fibres, which render the sausage case more shrinkable. Yet such paper is very expensive.

It is also known to use unsized paper in the manufacture of artificial skins for sausages, which faciltates impregnation of the paper pulp. However, artificial skins prepared in such manner neither stood the test, since it is not possible to completely harden the impregnating mass, so that the paper case will adhere to the stuffing, and, when the sausage is peeled, relatively large morsels of meat will stick to the paper tube.

According to the invention, all these deficiencies are removed by treating the paper tube with a saturating mixture of animal substances and tragacanth or similar mucilaginous or gelatinous substances, such as agar-agar, Iceland moss or the like, such treatment being followed by a hardening process—as known per se—on the saturated case.

A mode of carrying out the process according to the invention is now given by way of example:

Small pieces of fleshy fibre or skin particles are obtained—in a known manner—by removing the grease and gelatin from a fresh or dried pigskin. The mass resulting from this treatment is boiled under pressure, and, thereby, reduced to a fibrous state, such reduction allowing of being facilitated by the aid of mechanical means. To this mass of fibres is added pure tragacanth, and that in a proportion of about 1–10% (by weight) of the fleshy mass. With this mixture a paper tube previously immersed for a short time in boiling water is saturated in a known manner, and then—in a manner equally known—hardened by being treated with formaldehyde. This hardening treatment will not influence the added tragacanth, but only the meaty mass, so that the agglomerating power of the tragacanth will be preserved. Due to this addition of tragacanth or the like, the paper case will sufficiently adhere to the stuffing of the sausage, so that no air-bubbles will be formed under the paper tube. Moreover, owing to the said addition, the flexibility of the case will be preserved despite the hardening treatment, so that no wrinkles will be formed. Finally, the contents of tragacanth within the saturating mass will favor the formation of mould on the outside of the skin of the sausage, whereby the said skin will not only obtain the appearance of animal guts, but also safeguard the durability of the sausage.

What I claim is:

1. A process for the manufacture of paper casings for sausages comprising removing grease and gelatine from a fibrous mass derived from animal hide substances, mixing said fibrous mass with tragacanth, impregnating a paper tube with the mixture, and hardening the thus impregnated paper tube.

2. A process for the manufacture of paper casings for sausages comprising removing grease and gelatine from a mass derived from animal hide substances, reducing the thus treated mass to a fibrous state, mixing said fibrous mass with tragacanth, immersing a paper tube for a short time in boiling water, impregnating the thus pretreated paper tube with the mixture, and hardening the impregnated paper tube.

3. A process for the manufacture of paper casings for sausages comprising removing grease and gelatine from a fibrous mass derived from animal hide substances, mixing said fibrous mass with between about 1% to about 10% of tragacanth taken by weight of the fibrous mass, impregnating a paper tube with the mixture, and hardening the impregnated paper tube.

4. A sausage casing comprising a paper impregnated with a fibrous mass derived from animal hide substances, freed from grease and gelatine and mixed with tragacanth.

5. A sausage casing comprising a dried and hardened paper impregnated with a fibrous mass derived from animal hide substances, freed from grease and gelatine, and mixed with between about 1% and about 10% tragacanth taken by weight of the fibrous mass.

ČENĚK BEDNÁŘ.